(12) United States Patent
Kwasniewski et al.

(10) Patent No.: US 7,486,752 B1
(45) Date of Patent: Feb. 3, 2009

(54) ALIGNMENT OF CLOCK SIGNAL WITH DATA SIGNAL

(75) Inventors: Tad Kwasniewski, Ottawa (CA); Bill Bereza, Nepean (CA); Shoujun Wang, Nepean (CA); Mashkoor Baig, Ottawa (CA); Haitao Mei, Kanata (CA)

(73) Assignee: Altera Corporation, San Jose, CA (US)

( * ) Notice: Subject to any disclaimer, the term of this patent is extended or adjusted under 35 U.S.C. 154(b) by 1012 days.

(21) Appl. No.: 10/739,445

(22) Filed: Dec. 17, 2003

(51) Int. Cl.
*H04L 7/00* (2006.01)
*H03D 3/24* (2006.01)

(52) U.S. Cl. ............... 375/354; 375/355; 375/375; 375/376

(58) Field of Classification Search ............ 375/354, 375/355, 371, 373, 375, 376, 326; 341/141, 341/165
See application file for complete search history.

(56) References Cited

U.S. PATENT DOCUMENTS

| | | | |
|---|---|---|---|
| 3,473,160 A | 10/1969 | Wahlstrom | 326/41 |
| 4,486,739 A | 12/1984 | Franaszek et al. | 341/59 |
| 5,313,499 A | 5/1994 | Coburn | |
| 5,566,204 A | 10/1996 | Kardontchik et al. | |
| 5,670,913 A * | 9/1997 | Garcia Palancar | 331/4 |
| 5,689,195 A | 11/1997 | Cliff et al. | 326/41 |
| 5,802,103 A | 9/1998 | Jeong | 326/41 |
| 5,909,126 A | 6/1999 | Cliff et al. | 326/41 |
| 6,008,680 A * | 12/1999 | Kyles et al. | 327/277 |
| 6,031,428 A | 2/2000 | Hill | 331/11 |
| 6,118,316 A * | 9/2000 | Tamamura et al. | 327/156 |
| 6,215,326 B1 | 4/2001 | Jefferson et al. | 326/41 |
| 6,215,689 B1 * | 4/2001 | Chhor et al. | 365/63 |
| 6,215,835 B1 * | 4/2001 | Kyles | 375/376 |
| 6,407,576 B1 | 6/2002 | Ngai et al. | 326/41 |
| 6,483,886 B1 | 11/2002 | Sung et al. | 375/376 |
| 6,549,596 B1 * | 4/2003 | Cretti et al. | 375/373 |
| 6,614,314 B2 | 9/2003 | d'Haene et al. | |
| 6,650,140 B2 | 11/2003 | Lee et al. | 326/39 |
| 6,662,305 B1 | 12/2003 | Salmon et al. | |
| 6,724,328 B1 * | 4/2004 | Lui et al. | 341/101 |
| 6,763,060 B1 * | 7/2004 | Knapp | 375/219 |
| 6,763,061 B1 * | 7/2004 | Strait et al. | 375/219 |

(Continued)

OTHER PUBLICATIONS

U.S. Appl. No. 10/059,014, filed Jan. 29, 2002, Lee et al.

(Continued)

*Primary Examiner*—Mohammad H Ghayour
*Assistant Examiner*—Lawrence B Williams
(74) *Attorney, Agent, or Firm*—Ropes & Gray LLP; Jeffrey H. Ingerman (57) ABSTRACT

A received clock signal is aligned ("eye centered") with a received data signal by recovering a separate clock from the data signal and comparing and aligning the received clock with the recovered clock by delaying one or both of the received clock and the received data as necessary. After the necessary delays are set, the comparison/alignment circuitry can be turned off, until the next time alignment is necessary, to conserve power. In a multiple channel system, any combination of each received data channel, the received clock, or individual branches of the received clock in each channel can be delayed as necessary. Each channel can have its own comparison/alignment circuitry so that all channels can be aligned simultaneously, or re-usable circuitry can be provided for connection sequentially to each channel where sequential alignment of the channels is fast enough.

30 Claims, 5 Drawing Sheets

U.S. PATENT DOCUMENTS

| | | | |
|---|---|---|---|
| 6,832,173 | B1 | 12/2004 | Starr et al. |
| 6,888,905 | B1* | 5/2005 | Cheah et al. ............... 375/355 |
| 6,977,959 | B2 | 12/2005 | Brunn et al. |
| 7,149,914 | B1* | 12/2006 | Asaduzzaman et al. ..... 713/500 |
| 7,170,964 | B2* | 1/2007 | Kocaman et al. ............ 375/376 |
| 7,272,677 | B1* | 9/2007 | Venkata et al. ............... 710/71 |
| 2001/0033188 | A1* | 10/2001 | Aung et al. ................. 327/141 |
| 2002/0022356 | A1* | 2/2002 | Shiflet ........................ 438/617 |
| 2002/0030522 | A1* | 3/2002 | Nakamura .................. 327/165 |
| 2003/0052709 | A1 | 3/2003 | Venkata et al. ............... 326/37 |
| 2003/0086517 | A1* | 5/2003 | Vallet et al. ................. 375/355 |
| 2003/0155955 | A1 | 8/2003 | Andrasic et al. ............ 327/277 |
| 2004/0141577 | A1 | 7/2004 | Brunn et al. |
| 2004/0205416 | A1* | 10/2004 | Shirota ........................ 714/48 |
| 2005/0031065 | A1 | 2/2005 | Gupta et al. |

OTHER PUBLICATIONS

U.S. Appl. No. 10/209,633, filed Jul. 30, 2002, Starr et al.
U.S. Appl. No. 10/273,899, filed Oct. 16, 2002, Venkata et al.
U.S. Appl. No. 10/317,262, filed Dec. 10, 2002, Venkata et al.
U.S. Appl. No. 10/317,264, filed Dec. 10, 2002, Venkata et al.
U.S. Appl. No. 10/349,541, filed Jan. 21, 2003, Venkata et al.
U.S. Appl. No. 10/637,982, filed Aug. 8, 2003, Venkata et al.
U.S. Appl. No. 10/668,900, filed Sep. 22, 2003, Asaduzzaman et al.
U.S. Appl. No. 10/672,901, filed Sep. 26, 2003, Asaduzzaman et al.
U.S. Appl. No. 10/713,877, filed Nov. 13, 2003, Churchill et al.
U.S. Appl. No. 10/722,665, filed Nov. 26, 2003, Wortman et al.
U.S. Appl. No. 10/470,120, filed Dec. 17, 2003, Wang et al.
U.S. Appl. No. 10/739,445, filed Dec. 17, 2003, Kwasniewski et al.
Cook, Barry M., "IEEE 1355 Data-Strobe Links: ATM Speed at RS232 Cost", Microprocessors and Microsystems, Elsevier, UK, vol. 21, No. 7-8, pp. 421-428 (Mar. 30, 1998).
Konstas, Jason, "Converting Wide, Parallel Data Buses to High Speed Serial Links", Cypress Semiconductor, pp. 19-30 (1999).
Lemme, Helmuth, "Schnelle Chips Für Flaschenhälse" Eletonik, Franzis Verlag GMBH. Munchen, DE, vol. 40, No. 22, pp. 104-109 (Oct. 29, 1991).
"Lucent Introduces 10Gb/s Ethernet FPGAs", Programmable Logic News and Views, Electronic Trend Publications, Inc., vol. IX, No. 11, pp. 7-8 (Nov. 2000).
"ORACA ORT82G5 0.622/1.0-1.25/2.0-2.5/3.125 Gbits/s Backplane Interface FPSC", Lucent Technologies, Microelectronics Group, Product Brief, pp. 1-8 (Feb. 2001).
"ORACA ORT82G5 1.0—1.25/2.0-2.5/3.125 Gbits/s Backplane Interface FPSC", Preliminary Data Sheet, Agree Systems Inc., pp. 1-35 (Jul. 2001).
"ORACA ORT8850 Field-Programmable System Chip (FPSC) Eight-Channel × 850 Mbits/s Backplane Transceiver", Data Sheet, Agere Systems Inc., pp. 1-6 (Jul. 2001).
"ORACA ORT8850 Field-Programmable System Chip (FPSC) Eight-Channel × 850 Mbits/s Backplane Transceiver", Product Brief, Agere Systems Inc., pp. 1-6 (Jul. 2001).
"Protocol Independent Gigabit Backplane Transceiver Using Lucent ORT4622/ORT8850 FPSCs", Lucent Technologies, Microelectronics Group, Application Note, pp. 1-10 (Jun. 2000).
"Rocket I/O Transceiver User Guide", UG024 (v1.2), Xilinx, Inc. (Feb. 25, 2002).
"Virtex-II Pro Platform FPGA Handbook", UG012 (v1.0), pp. 1-6, 27-32, 121-126, and 162-180, Xilinx, Inc. (Jan. 31, 2002).
"Virtex-II Pro Platform FPGAs: The Platform for Programmable Systems", <http://www.xilinx.com/virtex2pro> (visited Mar. 5, 2002).
U.S. Appl. No. 10/740,120, filed Dec. 17, 2003, Wang et al.

* cited by examiner

ALIGNMENT OF CLOCK SIGNAL WITH DATA SIGNAL

BACKGROUND OF THE INVENTION

This invention relates to the alignment of a received clock signal with a received data signal. More particularly, this invention relates to such alignment on a programmable logic device.

It is almost axiomatic that digital systems are clocked. For a clock of period T, the clock signal is typically a series of square (or rectangular) pulses of durations T/2, separated by zero-amplitude intervals of durations T/2. Such a clock has a rate or frequency of 1/T. The clock is used to time data signals, with each data pulse having a duration T. However, there is no reason why consecutive data pulses need be separated by zero-amplitude intervals. Therefore, two or more (n) consecutive data pulses can be transmitted as a single continuous "high" signal of duration nT. In each clock period T, one data pulse can be transmitted. Thus, the data rate of the system is the same as that of the clock rate. In a double data rate system, data is sampled on both rising and falling clock edges, resulting in a data rate twice that of the clock rate, with each data pulse having a duration T/2.

Because any particular data pulse can be either high ("1") or low ("0"), a train of unknown data pulses is commonly represented by two superposed waves, with the edges of the pulses are not purely vertical, so that the progression of pulses is distinctly visible. Each possible data position thus is shown as both high and low, signifying that either value is possible in a stream of actual data. Because the edges representing the pulse transitions in such a representation are not purely vertical, the intersecting inclined lines give each pulse position the appearance of an eye, and each pulse position is therefore referred to as a "data eye."

When sampling data, it is best that the sampling occur as close as possible to the center of the data eye, as far as possible from the transitions, because sampling during a transition could provide a false reading of the data. When the clock must be recovered from the data, clock recovery errors, in combination with other errors such as process and temperature variations as well as trace length variations, makes centering the sampling time in the data eye—"eye centering"—difficult or unreliable. Any such problems are compounded in a programmable logic device, where the circuit paths, as well as the clock recovery circuitry, differ from one user logic design to the next.

Clock data alignment is considered relatively easy when the clock is sent along with the data. However, in applications where the circuit path may vary, particularly in the case of programmable logic devices, alignment of the received data and the received clock cannot be assured. In particular, if one clock is sent in conjunction with more than one data signal, the clock as well as each of the data signals potentially is subject to a different delay, and continued alignment of the received clock with any one received data signal cannot be assured. Solutions to these problems are available, utilizing loop circuits—e.g., phase-locked loops or delay-locked loops—to align the clock with the data. However, such circuits continue to run after data alignment, consuming power unnecessarily where misalignment is the result only of circuit path differences or other factors that remain constant during operation.

It would be desirable to be able to provide a method and circuitry for reliable eye centering with reduced power consumption, and even in a programmable logic device.

SUMMARY OF THE INVENTION

The present invention achieves reliable clock-data alignment, with reduced power consumption, in synchronous applications, where the clock is sent with the data and the factors that give rise to clock-data misalignment are substantially constant during operation. Thus, e.g., if the only factor giving rise, in a particular synchronous application, to clock-data misalignment is path length differences between the clock path and the data path or paths, the invention can achieve clock-data alignment with low power consumption. Even if the "constant" factors are different each time the device is powered on, the invention will achieve the desired result.

In accordance with the invention, a clock recovery circuit is included in each data receiver. The clock recovery circuit derives a clock from the data (and aligns the clock with the data) using known clock data recovery techniques, when the system operates in an asynchronous mode where no separate clock is sent with the data. In a synchronous mode (where a separate clock is sent, but is subject to delay as described above), there is a "training model" at power-up (or during operation if something happens to misalign the clock and data and realignment is necessary), in which the clock recovery circuit recovers a clock from the data and aligns that clock with the data, as above. The recovered clock is then compared to the received clock and the received clock or data is delayed by a variable delay line until the received clock is aligned with the recovered clock. The received clock, as delayed (if at all), is then used to clock the received data, as delayed (if at all), in "run mode." While the clock recovery circuitry in the data receiving circuitry, and the circuitry for comparing the recovered clock to the received clock—both of which typically are loop circuits (e.g., phase-locked loops or delay-locked loops)—may continue to operate in run mode, they are not needed. As has been explained above, the conditions giving rise to misalignment are constant during operation, meaning there will be no alignment changes. Therefore the clock recovery circuitry in the data receiving circuitry, and the circuitry for comparing the recovered clock to the received clock, may be shut down during run mode to save power. If anything happens to affect the alignment, such as a temperature change (particularly a temperature change that is uneven across the device), the error will be detected elsewhere and the training mode reactivated as needed. When the alignment circuitry is shut down, a switch is closed connecting the delayed clock or data directly to the data receiving circuitry.

The invention applies whether one or many data signals are received along with the received clock, which is meant to be associated with however many data signals are received. In one embodiment, the data signals are aligned with the single clock signal by delaying each data signal as necessary. In a variant of this embodiment, the clock signal itself could also be delayed, depending on the relative delays detected, as discussed in more detail below. In any embodiment, the single clock signal branches off to data receiving circuitry for each data signal. In a second embodiment, the single clock signal is delayed a different amount in each of those branches, rather than delaying the data signals. In a variant of this embodiment, the data signals could be delayed as well, if necessary.

In either of the foregoing embodiments (and their variants), each data receiving circuit preferably has its own clock recovery circuit for both asynchronous operation and for training in synchronous operation. Preferably, there is only one separate comparison circuit (preferably a loop circuit as described) for comparing each respective recovered clock to the received clock. That one comparison circuit is used to adjust one delay line at a time sequentially, until all delay lines have been adjusted. However, it is also possible to provide a separate comparison circuit associated with each delay line. These comparison circuits could then operate simultaneously if desired. The tradeoff is one of area and power consumption versus speed. However, each comparison and delay determination is relatively fast, and sequential operation with a single circuit is not expected to lengthen the training cycle so much as to make the cost in area and power consumption of multiple comparison circuits worthwhile in most applications.

Therefore, in accordance with the present invention, there is provided a method of aligning a received clock signal with a received data signal. The method includes recovering a clock signal from the received data signal and aligning the recovered clock signal with the data signal. The received clock signal is then aligned with the recovered clock signal by delaying one of the received data signal and the received clock signal until alignment of the received clock signal and the recovered clock signal is achieved.

A serial data receiver for use with the method, and a programmable logic device incorporating the serial data receiver, are also provided.

BRIEF DESCRIPTION OF THE DRAWINGS

The above and other advantages of the invention will be apparent upon consideration of the following detailed description, taken in conjunction with the accompanying drawings, in which like reference characters refer to like parts throughout, and in which.

DETAILED DESCRIPTION OF THE INVENTION

As described above, the present invention achieves alignment of data with a received clock associated with that data— i.e., a clock sent with the data from essentially the source of the data and substantially aligned with the data at the time of transmission—where factors such as transmission delays may have caused misalignment of the clock and data during transmission. The receiver can have a single data receiving circuit or multiple data receiving circuits. Each data receiving circuit preferably includes a clock recovery circuit. The clock recovery circuit can be used in asynchronous operation—i.e., where no clock is sent with the data—to recover a clock from received data. In accordance with the invention, the clock recovery circuit also is used during synchronous operation— i.e., where a clock is sent with the data—to make certain in a "training mode" that the received clock is aligned with the data.

Specifically, in training mode, the clock recovery circuit is used to recover and align a clock from the received data, even though a separate clock has been received. A comparison circuit, which preferably is similar to a loop circuit—i.e., similar to a phase-locked loop or delay-locked loop—and to the clock recovery circuit, is used to compare the received clock to the recovered clock. Any phase difference detected between the received clock and the recovered clock is used to control one or more variable delay lines to delay either the received clock or the received data until the received clock is aligned with the recovered clock.

For example, if delay lines are provided for both the received data and the received clock, then if the received clock leads the recovered clock, the received clock can be delayed, while if the received clock lags the recovered clock, the received data can be delayed. On the other hand, if a delay line is provided only for one of the signals (i.e., only for the received clock or only for the received data), then if that signal's clock (i.e., the received clock if the delay line is provided for the received clock, or the recovered clock if the delay line is provided for the received data) leads the other signal's clock, that signal can be delayed by the lead amount. If a delay line is provided only for one of the signals and that signal's clock lags the other signal's clock, that signal can be delayed by a phase amount complementary to the lag amount. Thus, if a delay line is provided only for the received clock and the received clock lags the recovered clock by, e.g., 90°, because the recovered clock cannot be delayed (no delay line is provided in this example), and because the received clock cannot be advanced, the received clock instead can be delayed by 270°. The amount of the delay may be determined not in phase, but instead in the actual amount of time (generally expected to be in the picoseconds to tens-of-picoseconds range) needed to align the clocks. As stated above, after the delay line has been set, the clock recovery circuit and comparison circuit can be turned off to reduce power until the next time the training mode is needed.

It is possible, and indeed likely, that the serial receiver according to the invention will have multiple channels—i.e., multiple data receiving circuits for receiving multiple data signals. Preferably, in accordance with the invention, each of the data receiving circuits includes its own clock recovery circuit. This allows each channel to operate in asynchronous operation, and also facilitates operation in a clock-data alignment training mode according to this invention during synchronous operation.

In many cases, synchronous operation may involve multiple data signals sent from a single source, all of which are associated with one clock, also sent by the same source, with which they are intended to be synchronous. However, because of path length differences and/or other factors, the data signals arrive out of alignment with the clock, and most likely out of alignment with each other—i.e., the amount by which each data signal is out of alignment with the clock differs from the amount by which each other data signal is out of alignment with the clock. In such a case, in accordance with the invention, the clock recovery circuitry in each data receiving circuit is used in a training mode to recover a clock from that receiver's data and align the recovered clock with that data. Each of those recovered clocks is then compared to the received clock to set a delay that aligns the associated data with the received clock. That alignment can be achieved in one of several ways.

In one embodiment, a variable delay line is present in each data path, and a delay is determined and applied for each data signal. In a variant of that embodiment, a variable delay line is also present in the received clock path. For example, it may be possible that all of the data signals lag the received clock. Because those signals cannot be advanced, they would have to be delayed by a complementary phase amount if the clock could not be delayed. But with a delay line in the received clock path, the received clock could be delayed by an appropriate amount—e.g., by the largest lag among the data signals—and all the other data signals can be delayed accordingly.

In a second embodiment, the received clock branches to each data path (as it would be expected to do in any embodiment), and the variable delay lines are present in the individual clock branches, so that the received clock can be delayed by different amounts for each data path. In a variant of this embodiment, delays are also present in the data paths, so that if the received clock lags any data signal, that signal can be delayed, rather than further delaying the received clock by the complementary phase amount.

Regardless of which of the foregoing embodiments, and the respective variants thereof, is used, there also are two different embodiments with respect to the comparison circuitry that compares the recovered clock for each data signal with the received clock to determine the respective delay value for that data signal or its clock input. In one embodiment, a comparison circuit is provided for each data receiving circuit. This allows all of the delays to be determined substantially simultaneously, minimizing the time necessary to complete the training mode. In another embodiment, one comparison circuit is provided, with the ability to connect to each data receiving path separately. In this embodiment, the respective delays are determined one at a time, sequentially. Although this lengthens the duration of the training mode, in most applications training mode will be completed within an acceptable time in this embodiment.

The invention will now be described with reference to FIGS. 1-5.

Figure 1:
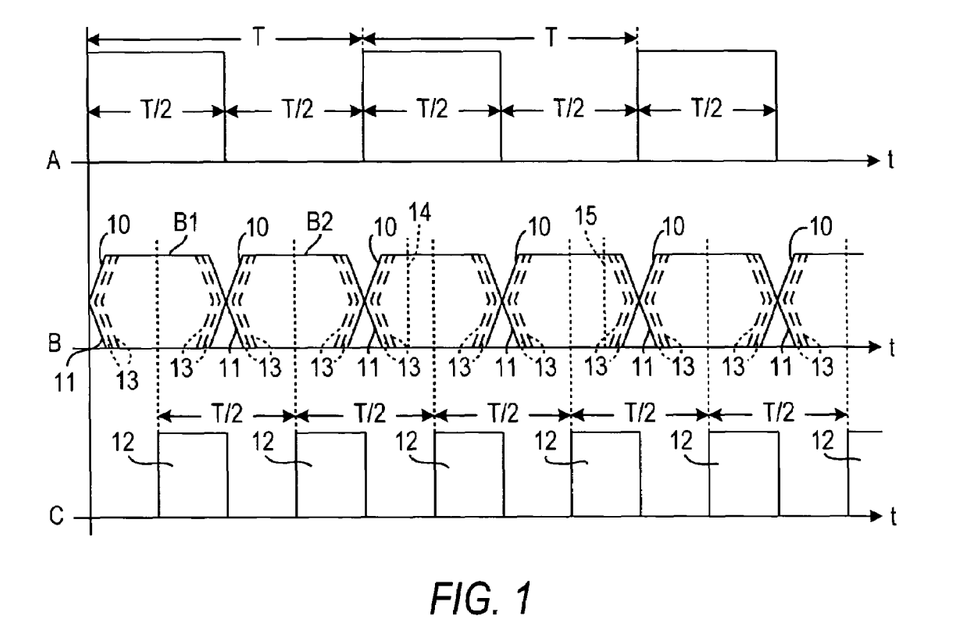
FIG. 1 is a set of timing diagrams showing clock and data signals as may be found in the present invention.

FIG. 1 shows as waveform A a clock having period T (i.e., a clock rate or frequency of 1/T). The clock signal preferably includes high intervals each of duration T/2, separated by low, or zero-amplitude, intervals also each of duration T/2 (although it is possible to imagine a clock with a different duty cycle and still with a period T). Waveform B shows a data pulse train clocked by waveform A. As discussed above, the data rate is twice the clock rate because there is no reason to separate data pulses from one another. Therefore, each T/2 slot can accommodate a data pulse. Because when the data pulse train is considered in the abstract (as opposed to particular data), it is not known whether any particular pulse will be high or low, waveform B includes the superposition of trace B1 and trace B2. As can be seen, the appearance of the two potential pulses in each slot, particularly in view of inclined trace portions 10, 11, is that of an eye, and is referred to as a "data eye" as mentioned above.

Waveform C is a sampling clock having the same rate as the data rate of waveform B. Each data pulse is sampled on a rising edge 12. Therefore, ideally waveform C, which is the recovered data clock, is offset from waveform A so that rising edges 12 occur in the center of each data pulse slot. If a rising edge 12 were to occur to close to transitions 10, 11, then any uncertainty in the timing of the transitions, as indicated by dashed lines 13, may cause read errors—e.g., if the transition is late, the previous value of the datum in that slot, rather than its current value, might be read if the read clock is early, as indicated by dashed line 14. The same may occur if the read clock is late, as indicated by dashed line 15. Therefore, it is important to be able to adjust the read clock so that it falls in the center of each data eye.

Figure 2:
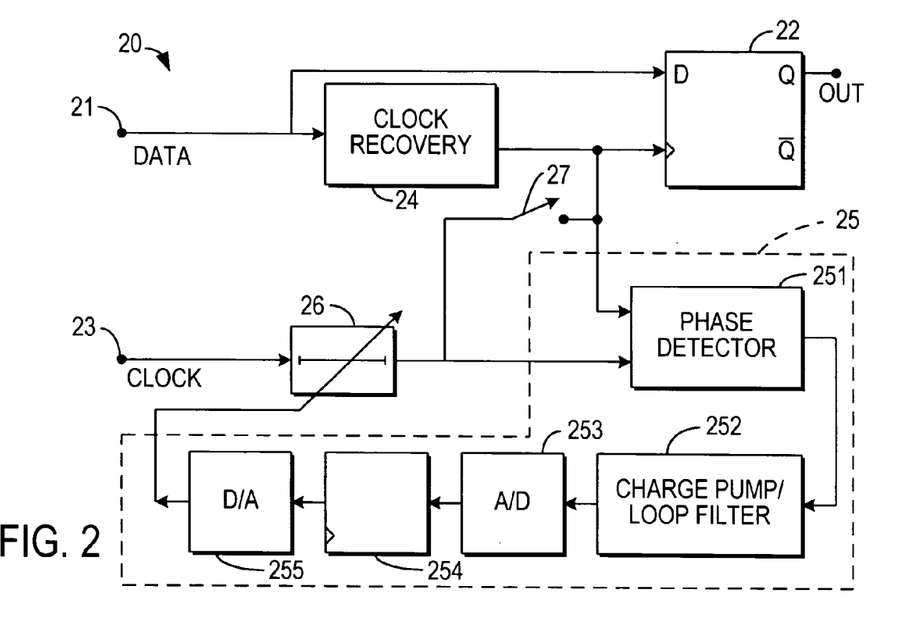
FIG. 2 is a schematic diagram of a data receiving circuit incorporating a first embodiment of the present invention.

FIG. 2 shows a data receiving circuit 20 incorporating a first embodiment of the present invention. Circuit 20 includes a data input 21 and a decision circuit 22, which may be as simple as a D-type flip flop, to which data input 21 is connected and which is meant to be clocked either by a clock sent with the incoming data signal and received at clock input 23 (synchronous operation), or by a clock recovered from the incoming data themselves by clock recovery circuitry 24 (asynchronous operation).

In the training mode of synchronous operation, in accordance with the present invention, comparison circuit 25, which preferably is loop circuit similar to a phase-locked loop or delay-locked loop, and incorporating a phase detector 251 and a charge pump and loop filter 252, adjusts variable delay line 26. Optionally, analog-to-digital converter 253, register 254 and digital-to-analog converter 255 are provided so that the delay value of variable delay line 26 can be stored and used as described below.

In accordance with the invention, a switch 27 preferably is provided so that once variable delay line 26 has been adjusted to align the received clock with the data signal, switch 27 closed to connect the delayed clock to decision circuit 22. At that point, clock recovery circuitry 24 and comparison circuit 25 can continue to run, but that would simply consume power unnecessarily, so they can be turned off to save power.

Figure 3:
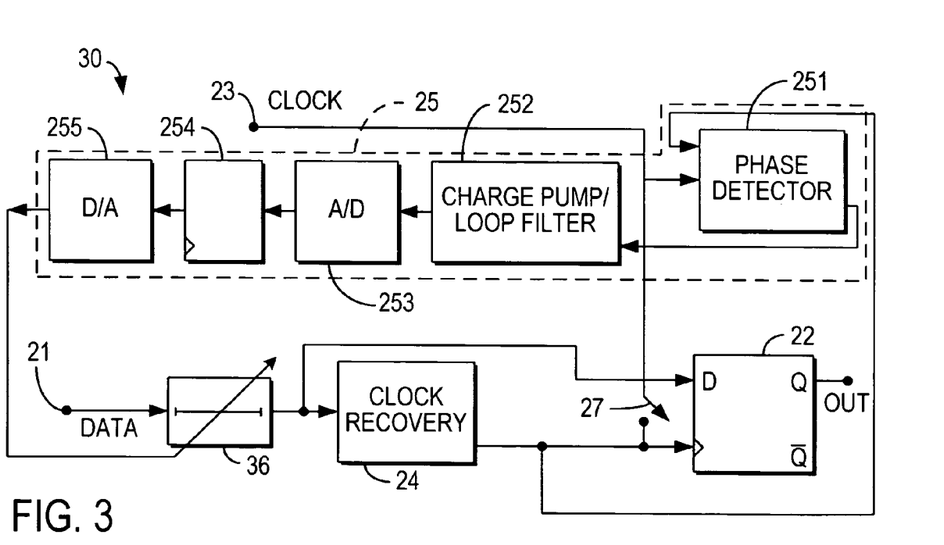
FIG. 3 is a schematic diagram of a data receiving circuit incorporating a second embodiment of the present invention.

In an alternative embodiment 30 shown in FIG. 3, adjustable delay line 36 is in the received data path rather than the received clock path. The operation of embodiment 30 is otherwise identical to embodiment 20. In either embodiment, if it is determined that the adjustable signal (the clock or the data, respectively) lags the other signal, because the signals can only be delayed and not advanced, embodiment 20 or 30 would instead apply a delay of a complementary phase amount to the clock or data, respectively. In a further embodiment (not shown), a variable delay could be provided in both the received clock path and the received data path. A suitable control circuit could be provided at the output of the comparison circuit that would determine which signal was leading which, and apply an appropriate delay to the leading signal.

Figure 4:
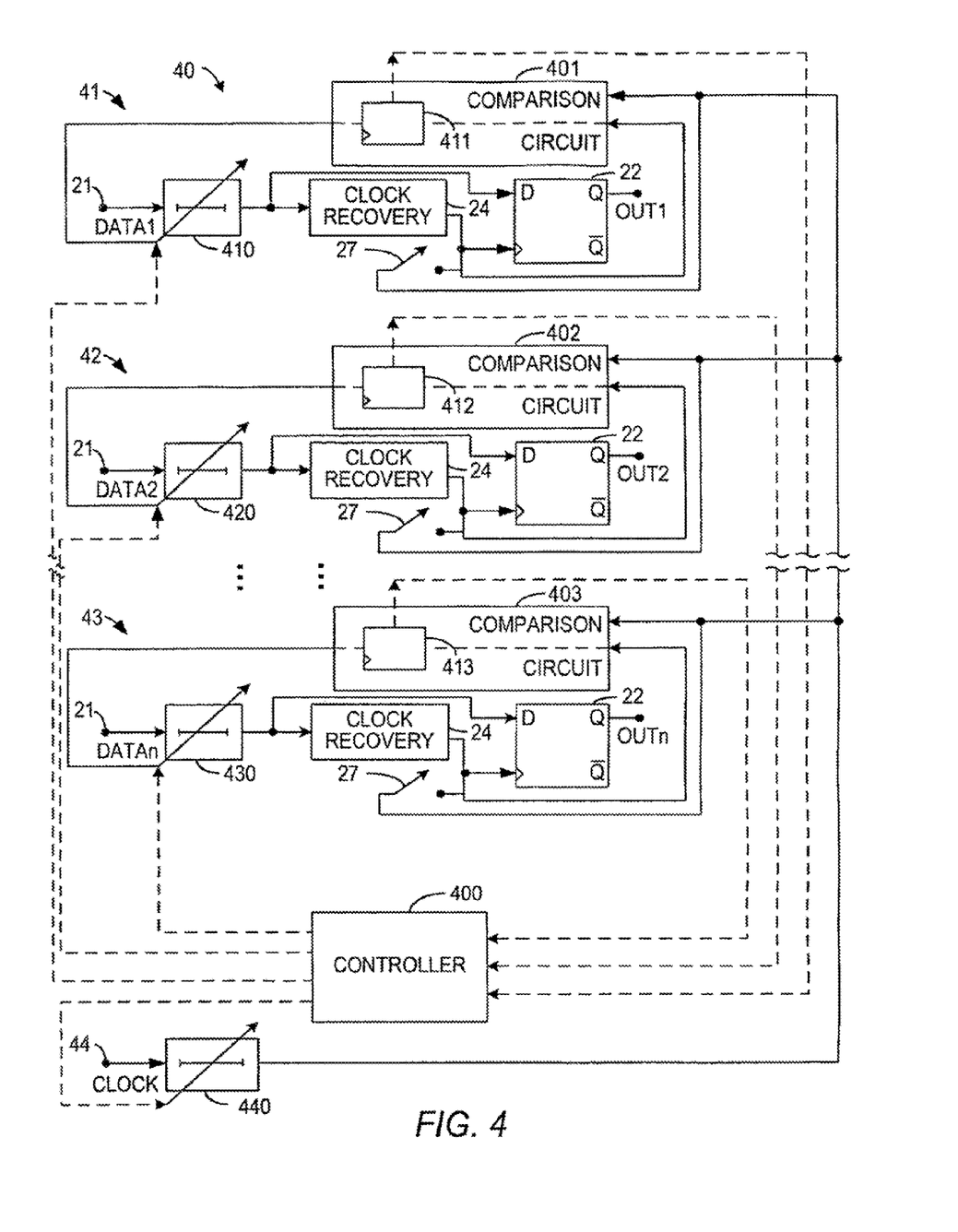
FIG. 4 is a first embodiment of a serial data receiver according to the present invention incorporating multiple data receiving circuits.
Figure 5:
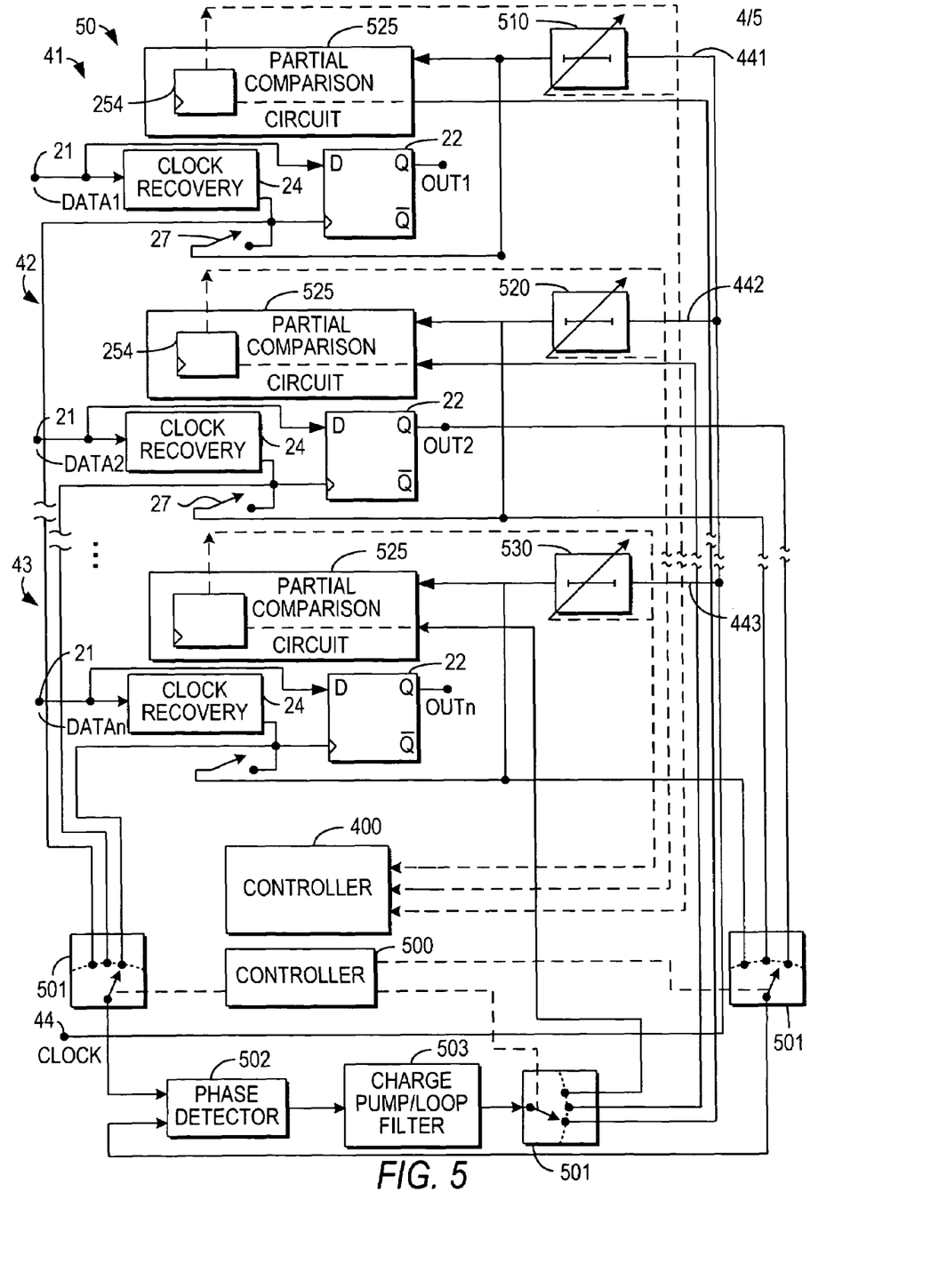
FIG. 5 is a second embodiment of a serial data receiver according to the present invention incorporating multiple data receiving circuits.

The multiple channel case (likely to be more common) is shown in FIGS. 4 and 5. In embodiment 40 shown in FIG. 4, each channel—i.e., each data receiving circuit 41-43—includes clock recovery circuitry 24, allowing use of that channel in an asynchronous system. A single received clock 44 is also available in a synchronous system. It should be noted that there may be more than one received clock, each associated with one or more received data channels. However, each group of one received clock and its associated data channels may be considered a single multiple channel receiver in accordance with this invention.

For use in a synchronous system, each data receiving circuit 41-43 has a respective variable delay line 410, 420, 430 on its input. Each of those variable delay lines is controlled by, and part of, a comparison circuit 401, 402, 403, each similar to comparison circuit 25 of FIGS. 2 and 3, that compares the received clock to the recovered clock and delays the respective incoming data channel as necessary. As seen, the values of the respective delays may be registered in registers 411, 412, 413. A further variable delay line 440 may be provided in the received clock path 44 as well, for use, e.g., in a situation as described above where the clock leads all of the data channels. In such a case, controller 400 may be used to compare all of the registered delays and determine how to apply the delays to the variable delay lines 410, 420, 430, 440—i.e., whether to delay only the received data, or to delay the received clock as well.

Embodiment 50 of FIG. 5 is similar to embodiment 40 but here the variable delay lines 510, 520, 530 are provided, in each respective data channel 41, in the respective branches 441, 442, 443 of received clock 44 42, 43. It may be possible in this embodiment, optionally, to provide variable delay lines (not shown) in the data paths as well, as in embodiment 40, and even (not shown) in received clock path 44 notwithstanding the presence of delay lines 510, 520, 530 in the individual clock branches. If all of these additional delay lines are present, controller 400 preferably would allocate the delays among them.

As described above, each comparison circuit is a loop circuit incorporating the respective variable delay line, as well as a phase detector, charge pump and loop filter. If the delay value is to be registered, the register, as well as the analog-to-digital converter and digital-to-analog converter are also provided. The individual variable delay line must remain individual to each path to be delayed, as must the register, if provided. However, the phase detector, charge pump and loop filter can be re-used, if sequential setting of the respective delay lines is acceptable, as it is in most cases as described above. Therefore, in embodiment 50, the phase detector 502 and charge pump/loop filter 503 are re-used, connected sequentially to the respective partial comparison circuits 525 by controller 500, via switches 501 (whose form is shown only conceptually), with each partial comparison circuit 525 including register 254 (shown) and A/D and D/A converters 253, 255 (not shown). It should be noted that embodiment 50 could be provided with complete individual comparison loops as in embodiment 40, and similarly that embodiment 40 could be provided with only partial comparison loops (variable delay line, and register if used), and reusable phase detector, charge pump and loop filter, as in embodiment 50.

A programmable logic device ("PLD") 60 incorporating clock recovery circuitry according to the present invention may be used in many kinds of electronic devices. One possible use is in a data processing system 900 shown in FIG. 6. Data processing system 900 may include one or more of the following components: a processor 901; memory 902; I/O circuitry 903; and peripheral devices 904. These components are coupled together by a system bus 905 and are populated on a circuit board 906 which is contained in an end-user system 907.

Figure 6:
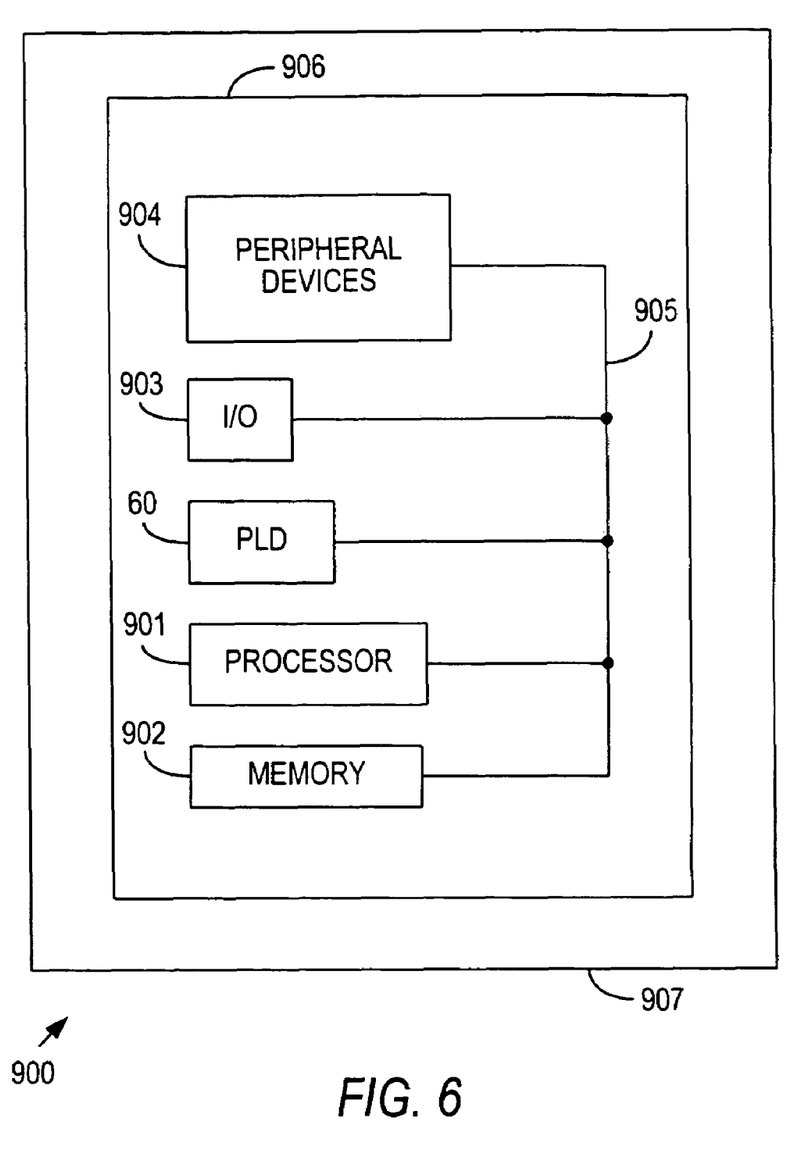
FIG. 6 is a schematic representation of a system including a programmable logic device incorporating the present invention.

System 900 can be used in a wide variety of applications, such as computer networking, data networking, instrumentation, video processing, digital signal processing, or any other application where the advantage of using programmable or reprogrammable logic is desirable. PLD 60 can be used to perform a variety of different logic functions. For example, PLD 60 can be configured as a processor or controller that works in cooperation with processor 901. PLD 60 may also be used as an arbiter for arbitrating access to a shared resources in system 900. In yet another example, PLD 60 can be configured as an interface between processor 901 and one of the other components in system 900. It should be noted that system 900 is only exemplary, and that the true scope and spirit of the invention should be indicated by the following claims.

Various technologies can be used to implement PLDs 60 as described above and incorporating this invention.

It will be understood that the foregoing is only illustrative of the principles of the invention, and that various modifications can be made by those skilled in the art without departing from the scope and spirit of the invention, and the present invention is limited only by the claims that follow.

What is claimed is:

1. A method of aligning a received clock signal with a received data signal, said method comprising:
   recovering a clock signal from said received data signal, and aligning said recovered clock signal with said data signal; and
   aligning said received clock signal with said recovered clock signal by delaying one of said received data signal and said received clock signal until alignment of said received clock signal and said recovered clock signal is achieved; wherein:
   said recovering of said clock signal, said aligning of said recovered clock signal, and said aligning of said received clock signal are accomplished using circuitry; said method further comprising:
   deactivating said circuitry used for said recovering of said clock signal, said aligning of said recovered clock signal, and said aligning of said received clock signal, after said delaying.

2. The method of claim 1 wherein said delaying comprises delaying said data signal.

3. The method of claim 1 wherein said delaying comprises delaying said clock signal.

4. The method of claim 1 wherein said delaying comprises determining and storing a delay.

5. The method of claim 1 wherein:
   there are a plurality of said data signals;
   said recovering comprises recovering a respective clock signal from each respective data signal and aligning said respective recovered clock signal with said respective data signal; and
   said aligning said received clock signal with said recovered clock signal comprises delaying each said received data signal.

6. The method of claim 5 further comprising delaying said received clock signal.

7. The method of claim 1 wherein:
   there are a plurality of said data signals;
   said recovering comprises recovering a respective clock signal from each respective data signal and aligning said respective recovered clock signal with said respective data signal; and
   said aligning said received clock signal with said recovered clock signal comprises deriving a respective delay of said received clock signal for association with said respective data signal, and delaying said received clock signal, in association with said respective data signal, by said respective delay.

8. A serial data receiver comprising:
   data input circuitry that receives a serial data signal from outside said receiver;
   clock input circuitry that receives a clock signal associated with said serial data signal;
   clock recovery circuitry that recovers a clock signal from said serial data signal and aligns said recovered clock signal with said serial data signal; and
   alignment circuitry for aligning said received clock signal with said recovered clock signal by delaying at least one of said received serial data signal and said received clock signal; wherein:
   said clock recovery circuitry and said alignment circuitry are powered down after said received clock signal is aligned with said recovered clock signal.

9. The serial data receiver of claim 8 wherein:
   said alignment circuitry comprises:
   a loop circuit, and
   a variable delay line; and
   said loop circuit adjusts said variable delay line until said received clock signal is aligned with said recovered clock signal.

10. The serial data receiver of claim 9 wherein said delay line is in said data input circuitry and delays said received serial data signal.

11. The serial data receiver of claim 9 wherein said delay line is in said clock input circuitry and delays said received clock signal.

12. The serial data receiver of claim 9 further comprising:
a loop bypass for connecting said delay line to said data input circuitry; wherein:
said loop bypass is open when said clock recovery circuitry and said alignment circuitry are operating to align said received clock signal with said recovered clock signal; and
said loop bypass is closed after said received clock signal is aligned with said recovered clock signal.

13. The serial data receiver of claim 8 wherein:
said data input circuitry receives a plurality of serial data input signals, said received clock signal being associated with said serial data signals;
said clock recovery circuitry recovers a respective clock signal from each respective one of serial data signals and aligns said respective recovered clock signal with said respective serial data signal; and
said alignment circuitry aligns each respective recovered clock signal with said received clock signal by delaying at least one of (a) said respective received serial data signal, and (b) said received clock signal as associated with said respective received serial data signal.

14. The serial data receiver of claim 13 wherein:
said alignment circuitry aligns each respective recovered clock signal with said received clock signal by delaying said respective received serial data signal, said alignment circuitry comprising:
a loop circuit, and
a respective variable delay line associated with each respective received serial data signal; and
said loop circuit adjusts said variable delay line until said received clock signal is aligned with said recovered clock signal.

15. The serial data receiver of claim 14 wherein said loop circuit of said alignment circuitry comprises a single loop circuit for all of said data signals.

16. The serial data receiver of claim 14 wherein said loop circuit of said alignment circuitry comprises a respective loop circuit associated with each respective received serial data signal.

17. The serial data receiver of claim 14 wherein said alignment circuitry further comprises a delay line in said clock input circuitry for delaying said received clock signal.

18. The serial data receiver of claim 13 wherein:
a branch of said clock input circuitry is associated with each respective received serial data signal;
said alignment circuitry aligns each respective recovered clock signal with said received clock signal by delaying said received clock signal as associated with said respective received serial data signal, said alignment circuitry comprising:
a loop circuit, and
a respective variable delay line in each said branch; and
said loop circuit adjusts said variable delay line until said received clock signal is aligned with said recovered clock signal.

19. The serial data receiver of claim 18 wherein said loop circuit of said alignment circuitry comprises a single loop circuit for all of said data signals.

20. The serial data receiver of claim 18 wherein said loop circuit of said alignment circuitry comprises a respective loop circuit associated with each respective received serial data signal.

21. A programmable logic device comprising the serial data receiver of claim 8.

22. A digital processing system comprising:
processing circuitry;
a memory coupled to said processing circuitry; and
a programmable logic device as defined in claim 21 coupled to the processing circuitry and the memory.

23. A printed circuit board on which is mounted a programmable logic device as defined in claim 21.

24. The printed circuit board defined in claim 23 further comprising:
memory circuitry mounted on the printed circuit board and coupled to the programmable logic device.

25. The printed circuit board defined in claim 24 further comprising:
processing circuitry mounted on the printed circuit board and coupled to the memory circuitry.

26. An integrated circuit device comprising the serial data receiver of claim 8.

27. A digital processing system comprising:
processing circuitry;
a memory coupled to said processing circuitry; and
an integrated circuit device as defined in claim 26 coupled to the processing circuitry and the memory.

28. A printed circuit board on which is mounted an integrated circuit device as defined in claim 26.

29. The printed circuit board defined in claim 28 further comprising:
memory circuitry mounted on the printed circuit board and coupled to the integrated circuit device.

30. The printed circuit board defined in claim 29 further comprising:
processing circuitry mounted on the printed circuit board and coupled to the memory circuitry.

* * * * *